(12) United States Patent
Takemura

(10) Patent No.: US 7,802,072 B2
(45) Date of Patent: Sep. 21, 2010

(54) DATA STORAGE DEVICE, MEMORY MANAGEMENT METHOD AND PROGRAM FOR UPDATING DATA RECORDED IN EACH OF A PLURALITY OF PHYSICALLY PARTITIONED MEMORY AREAS

(75) Inventor: Toshiharu Takemura, Tokyo (JP)

(73) Assignee: Felica Networks, Inc., Tokyo (JP)

( * ) Notice: Subject to any disclaimer, the term of this patent is extended or adjusted under 35 U.S.C. 154(b) by 461 days.

(21) Appl. No.: 11/888,054

(22) Filed: Jul. 31, 2007

(65) Prior Publication Data

US 2008/0034182 A1  Feb. 7, 2008

(30) Foreign Application Priority Data

Aug. 2, 2006  (JP) ............................ P2006-210873

(51) Int. Cl.
*G06F 12/00* (2006.01)
(52) U.S. Cl. ........................ 711/173; 711/129; 711/165; 711/170
(58) Field of Classification Search .................. 711/129, 711/165, 170–173
See application file for complete search history.

(56) References Cited

U.S. PATENT DOCUMENTS

2007/0198614 A1 * 8/2007 Zhang et al. ................ 707/205

FOREIGN PATENT DOCUMENTS

| JP | 2000 172490 | 6/2000 |
| JP | 2001 5717 | 1/2001 |

\* cited by examiner

*Primary Examiner*—Jasmine Song
(74) *Attorney, Agent, or Firm*—Frommer Lawrence & Haug LLP; William S. Frommer; Thomas F. Presson

(57) ABSTRACT

A data storage device comprises a memory that includes a plurality of physically partitioned memory areas with a rewrite buffer area to be used for data rewrite set within each of the partitioned memory areas and a memory management unit that updates data recorded in each partitioned memory area by utilizing the corresponding rewrite buffer area is set within the partitioned memory area.

7 Claims, 9 Drawing Sheets

| | Da | Db | Dc | Dd |
|---|---|---|---|---|
| &0x00 | | | | |
| &0x04 | Sys | Area | blk | blk |
| &0x08 | Svc | blk | blk | blk |
| &0x0C | wb | wb | wb | wb |
| &0x10 | blk | blk | blk | blk |

| | | | | |
|---|---|---|---|---|
| &0x80 | &0x04 | &0x05 | &0x08 | &0xFF |
| &0x84 | &0xFF | &0xFF | &0xFF | &0xFF |
| &0x88 | &0xFF | &0xFF | &0xFF | &0xFF |
| &0x8C | &0x00 | &0x01 | &0x02 | &0x03 |
| &0x90 | &0xFF | &0xFF | &0xFF | &0xFF |
| &0x94 | &0xFF | &0xFF | &0xFF | &0xFF |
| &0x98 | &0xFF | &0xFF | &0xFF | &0xFF |
| &0x9C | &0xFF | &0xFF | &0xFF | &0xFF |

FIG.9A

| | | | | 144 |
|---|---|---|---|---|
| &0x00 | S0 | S0 | S1 | S0 |
| &0x04 | S0 | S1 | S0 | S0 |
| &0x08 | S0 | S0 | S0 | S1 |
| &0x0C | wb | wb | wb | wb |
| &0x10 | S0 | S1 | S1 | S0 |
| &0x14 | S0 | S0 | S0 | S0 |
| &0x18 | S0blk | S0blk | S0blk | S0blk |
| &0x1C | S0blk | S0blk | S0blk | S0blk |
| &0x20 | S0blk | S0blk | S0blk | S0blk |

FIG.9B

| | | | | 144 |
|---|---|---|---|---|
| &0x00 | S0 | S0 | S1 | S0 |
| &0x04 | S0 | S1 | S0 | S0 |
| &0x08 | S0 | S0 | S0 | S1 |
| &0x0C | wb | wb | wb | wb |
| &0x10 | S0 | S1 | S1 | S0 |
| &0x14 | S0 | S0 | S0 | S0 |
| &0x18 | S0blk | S0blk | S0blk | S0blk |
| &0x1C | S0blk | S0blk | S2 | S2 |
| &0x20 | S2 | S2(Dc) | S2blk | S2blk |

FIG.9C

| | | | | 144 |
|---|---|---|---|---|
| &0x00 | S0 | S0 | S1 | S0 |
| &0x04 | S0 | S1 | S0 | S0 |
| &0x08 | S0 | S0 | S1 | S0 |
| &0x0C | S2 | S2(Dc') | S2blk | S2blk |
| &0x10 | S0 | S1 | S1 | S0 |
| &0x14 | S0 | S0 | S0 | S0 |
| &0x18 | S0blk | S0blk | S0blk | S0blk |
| &0x1C | S0blk | S0blk | S2 | S2 |
| &0x20 | wb | wb | wb | wb |

FIG.10A

| | | | | |
|---|---|---|---|---|
| &0x00 | S0 | S0 | S1 | S0 |
| &0x04 | S0 | S1 | S0 | S0 |
| &0x08 | S0 | S0 | S0 | S1 |
| &0x0C | S0 | S1 | S0 | S0 |
| &0x10 | S0 | S1 | S1 | S0 |
| &0x14 | S0 | S0 | S0 | S0 |
| &0x18 | S0 | S0 | S0blk | S0blk |
| &0x1C | S0blk | S0blk | S0blk | S0blk |
| &0x20 | S0blk | S0blk | S0blk | S0blk |
| &0x24 | S0blk | S0blk | S0blk | S0blk |
| &0x28 | wb | wb | wb | wb |

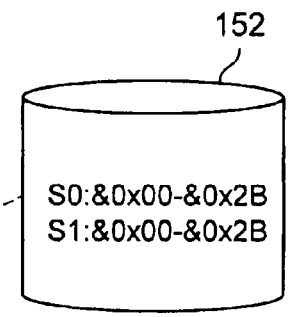

| | | | | |
|---|---|---|---|---|
| &0x00 | S0 | S0 | S1 | S0 |
| &0x04 | S0 | S1 | S0 | S0 |
| &0x08 | S0 | S0 | S0 | S1 |
| &0x0C | S0 | S1 | S0 | S0 |
| &0x10 | S0 | S1 | S1 | S0 |
| &0x14 | S0 | S0 | S0 | S0 |
| &0x18 | S0 | S0 | S0blk | S0blk |
| &0x1C | wb | wb | wb | wb |
| &0x20 | S2blk | S2blk | S2 | S2 |
| &0x24 | S2 | S2 | S2(Dc) | S2 |
| &0x28 | wb(S2) | wb(S2) | wb(S2) | wb(S2) |

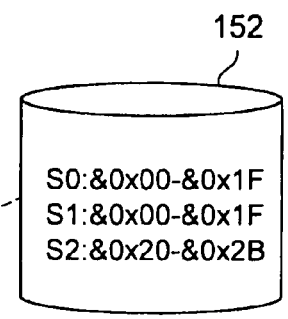

| | | | | |
|---|---|---|---|---|
| &0x00 | S0 | S0 | S1 | S0 |
| &0x04 | S0 | S1 | S0 | S0 |
| &0x08 | S0 | S0 | S0 | S1 |
| &0x0C | S0 | S1 | S0 | S0 |
| &0x10 | S0 | S1 | S1 | S0 |
| &0x14 | S0 | S0 | S0 | S0 |
| &0x18 | S0 | S0 | S0blk | S0blk |
| &0x1C | wb | wb | wb | wb |
| &0x20 | S2blk | S2blk | S2 | S2 |
| &0x24 | wb(S2) | wb(S2) | wb(S2) | wb(S2) |
| &0x28 | S2 | S2 | S2(Dc') | S2 |

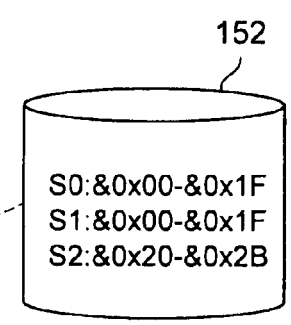

S0:&0x00-&0x1F
S1:&0x00-&0x1F
S2:&0x20-&0x2B

DATA STORAGE DEVICE, MEMORY MANAGEMENT METHOD AND PROGRAM FOR UPDATING DATA RECORDED IN EACH OF A PLURALITY OF PHYSICALLY PARTITIONED MEMORY AREAS

CROSS REFERENCES TO RELATED APPLICATIONS

The present invention contains subject matter related to Japanese Patent Application JP 2006-210873 filed in the Japan Patent Office on Aug. 2, 2006, the entire contents of which being incorporated herein by reference.

BACKGROUND OF THE INVENTION

1. Filed of the Invention

The present invention relates to a data storage device, a memory management method and a program.

2. Description of the Related Art

A memory, in which data exchanged with a reader/writer (which has a function for reading or writing information in a non-contact type IC(Integrated Circuit) card and the like,) through communication, an application program needed to provide services and the like can be stored, is usually included in a communication device capable of non-contact communication, such as a portable telephone, via a non-contact type IC card or a non-contact type IC chip installed therein. Such a memory may be a volatile memory used as a buffer or the like or it may be a nonvolatile memory used to record user data and an application program. In the nonvolatile memory, user information and information on a file system used for accessing to the user information, for instance, may be recorded.

In addition, the nonvolatile memory may be partitioned into a plurality of memory areas, each allocated to one of various systems. The term "system" in this context refers to a logical IC card function which may be provided in, for instance, a single non-contact type IC card having a single function.

The data area may be partitioned by adopting a logical partitioning technology in which the address range of each partitioned memory area is defined based upon logical addresses indicating virtual recording positions or by adopting a physical partitioning technology in which the address range of each partitioned memory area is defined based upon physical addresses indicating the recording positions in the actual memory. It is to be noted that a logical address is mapped in relation to the physical address corresponding to the particular logical address. However, contiguous logical addresses do not necessarily correspond to contiguous physical addresses. For this reason, when the memory is partitioned through logical partitioning technology, contiguous logical addresses indicating a given partitioned memory area may be mapped at discrete physical addresses. In such a case, even when it is known that the data to be extracted are contained in a specific logical address range (memory area), the communication device executes a search over a physical address range in the actual memory, which is greater than the logical address range, resulting in poor search efficiency.

In the physical partitioning technology, each physical address range is allocated to one of the partitioned memory areas, and thus, the communication device searching for data in a specific memory area, executes a search over the physical address range allocated to the particular memory area, assuring a high level of search efficiency. For instance, Japanese Patent Application Publication No. 2000-172490 discloses a data search method adopting such a physical partitioning technology. However, even when the memory is partitioned by adopting the physical partitioning technology, the individual partitions do not always maintain their continuity from one another. Such a situation may manifest in, for instance, the nonvolatile memory included in the communication device described earlier.

A memory management system that effectively prevents data loss is adopted in nonvolatile memory in a communication device or the like as measures against data loss in the event of a power supply interruption occurring during a data write or a communication interruption occurring before data transfer completion. For instance, when data are updated in the communication device, the new data may be first buffered in an available area and the old data may be erased only when the buffering process is completed, instead of directly writing the new data over the existing data.

SUMMARY OF THE INVENTION

There is an issue to be addressed with regard to the memory management method described above in that even if systems are each allocated to one of the physically partitioned memory areas, the data corresponding to a single system may become dispersed at separate positions in the actual memory as data update processing is executed repeatedly. For instance, when updating the data belonging to a given system, the communication device will first record the new data into a buffer area located at a given position in the actual memory. In this situation, once the data having been recorded in the buffer area are activated, part of the data (the part corresponding to the new data) belonging to the system will be set at a separate position in the actual memory. For this reason, the communication device searching for the data belonging to the system will need to execute the data search over a large address range in the actual memory. As a result, it is difficult for the communication device to access the desired data quickly.

Accordingly, the present invention, having been completed by addressing the issues described above, provides a new and improved data storage device, a new and improved memory management method and a new and improved program, with which the length of time required for data search processing can be reduced.

According to an embodiment of the present invention, there is provided a data storage device, including a memory that includes a plurality of physically partitioned memory areas with a rewrite buffer area to be used for data rewrite set within each of the partitioned memory areas; and a memory management unit that updates data recorded in each partitioned memory area by utilizing the rewrite buffer area.

The memory in the data storage device described above includes a plurality of physically partitioned memory areas with a rewrite buffer area used for data rewrite set within each of the partitioned memory areas. In addition, the memory management unit updates the data recorded in each of the partitioned memory areas by utilizing the rewrite buffer area.

By adopting the structure described above in a data storage device, safe data update processing may be executed by utilizing the buffer area in each partitioned memory area, assuring potential advantages of faster data update processing and better data reliability.

The memory management unit may repair fragmented data recorded in each partitioned memory area (defragmentation). The device structure described above enables defragmentation of data in units of the individual partitioned memory areas, realizing a potential advantage of a reduction in the length of time required for the defragmentation processing executed to defragment the data.

The memory management unit may defragment the data recorded in each partitioned memory area when the data storage device is started up. By defragmenting before drive of the data storage device starts, as described above, the subsequent data processing may be executed with better efficiency.

The memory management unit may defragment data recorded in a partitioned memory area when deleting the data recorded in the partitioned memory area. Under normal circumstances, the fragmentation tends to occur readily during data deletion. Accordingly, by executing defragmentation processing each time the data deletion processing is executed, the memory management unit is more likely to be able to effectively defragment data before the degree of fragmentation becomes serious. With such defragmentation processing enabled, advantages such as a reduction in the length of time required for a single session of defragmentation processing while being able to keep the extent of fragmentation at a relatively insignificant level, are likely to be assured.

The rewrite buffer area may assume a size matching the smallest unit of data that can be written into the memory.

According to another embodiment of the present invention, there is provided a memory management method that includes a step of updating data recorded in each of a plurality of physically partitioned memory areas in a memory by utilizing a rewrite buffer area used for data rewrite, which is set within each memory partition.

The memory management method includes a step of updating the data recorded in each partitioned memory area among the plurality of physically partitioned memory areas in the memory by utilizing the rewrite buffer area set in the memory area. By adopting the method described above, safe data update processing may be executed by utilizing the buffer area in each partitioned memory area, assuring potential advantages of faster data update processing and better data reliability.

According to another embodiment of the present invention, there is provided a program that enables a computer to achieve a function of updating data recorded in each of a plurality of physically partitioned memory areas in a memory by utilizing a rewrite buffer area used for data rewrite, which is set in each memory area.

The program described above enables the computer to achieve a function of updating the data recorded in each partitioned memory area among the plurality of physically partitioned memory areas in the memory by utilizing the rewrite buffer area set in the memory area. By using the program described above, safe data update processing may be executed by utilizing the buffer area in each partitioned memory area, assuring potential advantages of faster data update processing and better data reliability.

According to the embodiments of the present invention described above, there is a potential advantage of a reduction in the length of time expended on data search processing. There is also an added potential advantage of a reduction in the length of time expended on the defragmentation of data.

BRIEF DESCRIPTION OF THE DRAWINGS

FIG. 4 shows the pre-update physical table used in the embodiment;

FIG. 5 shows the pre-update management table used in the embodiment;

FIG. 9A illustrates a memory area physical partitioning process and a data update process;

FIG. 9B illustrates a memory area physical partitioning process and a data update process;

FIG. 9C illustrates a memory area physical partitioning process and a data update process;

FIG. 10A illustrates the memory area physical partitioning process and the data update process executed in the embodiment;

FIG. 10B illustrates the memory area physical partitioning process and the data update process executed in the embodiment;

FIG. 10C illustrates the memory area physical partitioning process and the data update process executed in the embodiment;

DETAILED DESCRIPTION OF THE PREFERRED EMBODIMENTS

Figure 1:
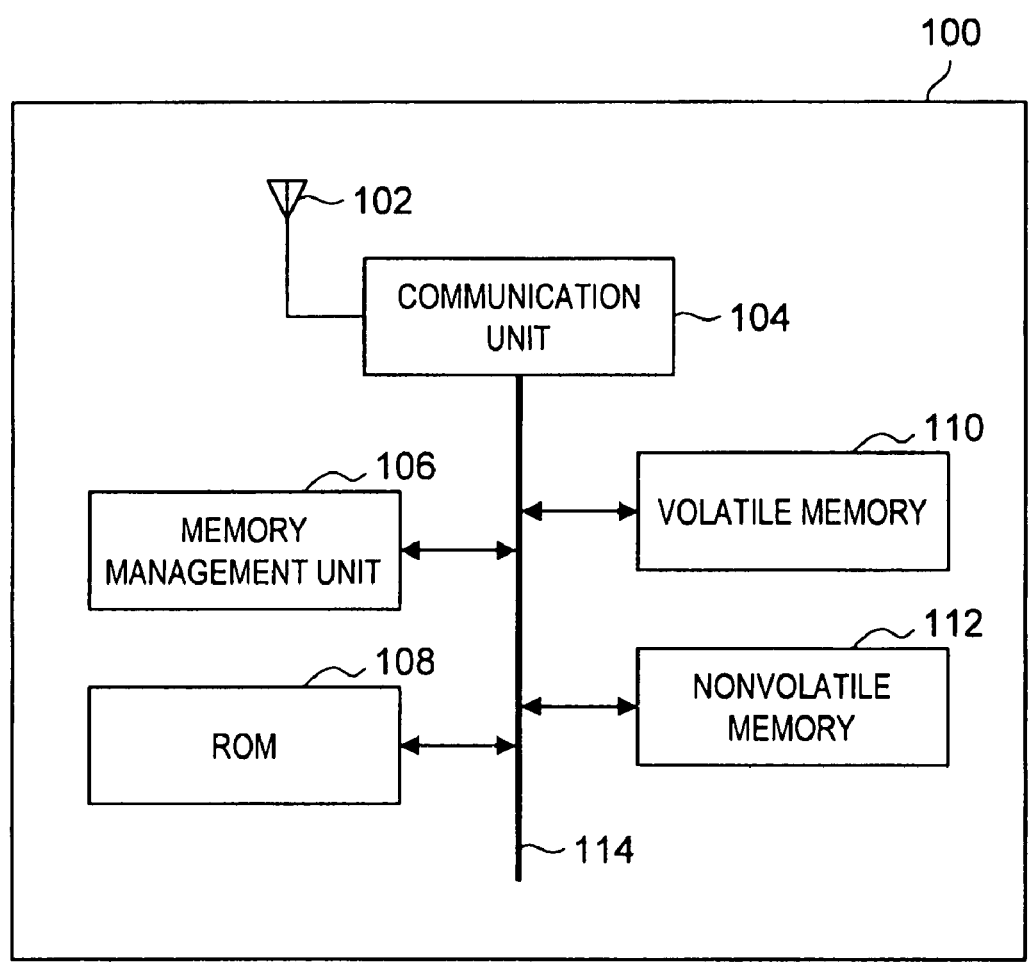
FIG. 1 is a block diagram showing the structure adopted in a communication device achieved in an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

First, the data storage device achieved in the first embodiment of the present invention is explained. A utilization mode of the data storage device is first explained by describing a communication device as a specific example and then the data update method according to the embodiment is explained.

(Functional Structure of the Data Storage Device)

First, a specific structural example that may be adopted in a communication device 100, which includes the data storage device, is explained. While an explanation is given here by assuming that the communication device 100 is a non-contact type IC card, the present invention may be adopted in a communication device 100 other than a non-contact type IC card. For instance, the communication device 100 may be a portable telephone having installed therein a non-contact type IC chip. In addition, the data storage device may be installed in, for instance, a portable music player, a wristwatch, a personal computer, a PDA (personal digital assistant) or an information home appliance, or it may be installed in any electronic device having a non-contact type IC card function.

In reference to FIG. 1, the functional structure of the communication device 100 is explained. The principal components of the communication device 100 include an antenna 102, a communication unit 104, a memory management unit

106, a ROM (Read Only Memory) 108, a volatile memory 110, a nonvolatile memory 112 and a CPU (Central Processing Unit) 116.

The antenna 102, which may be a loop antenna, is mainly utilized for carrier wave exchange with a reader/writer for a non-contact type IC card, although this is not indicated clearly in the figure. The communication device 100, capable of information exchange via the carrier wave, may also receive power supplied from the reader/writer.

Although not indicated in the figure, the communication unit 104 includes a front-end circuit and a power regenerating circuit as its principal components. The front-end circuit receives data from a carrier wave originating from the reader/writer, and is also capable of regenerating a clock to be used to drive various circuits in the communication device 100 by dividing the frequency of the carrier wave. In addition, the power regenerating circuit is capable of regenerating the power to be used to drive the individual circuits in the communication device 100 by using the carrier wave received from the reader/writer. The communication unit 104 provides the power and the data received from the reader/writer to another structural component via a bus 114.

Programs and data mainly used by the CPU 116 or the memory management unit 106, are stored in the ROM 108. For instance, a program based upon which the data area in the nonvolatile memory 112 is partitioned or a program based upon which an active data area is selected may be stored in the ROM 108. Data written in the ROM 108 during the production of the communication device 100 are not rewritten and thus, the ROM 108 is utilized only for read.

The CPU 116 controls the operations of the individual structural components included in the communication device 100, the principal components of which include the communication unit 104 and the memory management unit 106. For instance, CPU 116 executes control processing to control data write/read processing for the volatile memory 1 10, data update processing for the nonvolatile memory 1 12 and the like. While the memory management unit 106 and the CPU 116 are illustrated as separate entities in the figure, the functions of the memory management unit 106 may be achieved at the CPU 116 based upon a specific program.

The volatile memory 110 mainly functions as a buffer where data received from the reader/writer via the communication unit 104 are temporarily stored. The data recorded in the volatile memory 110 are lost once the power supply from the reader/writer stops. The data recorded in the volatile memory 110, which may be constituted with, for instance, a RAM (Random Access Memory), can be freely rewritten while power is supplied.

The memory management unit 106 executes recording control on the volatile memory 110 and the nonvolatile memory 112 based upon programs and data recorded in the ROM 108. For instance, the memory management unit 106 executes data rewrite processing for the volatile memory 110 and the nonvolatile memory 112. The rewrite processing may be executed based upon a program recorded in the ROM 108.

The nonvolatile memory 112 includes a plurality of physically partitioned memory areas each of which, in turn, includes a rewrite buffer area used for data rewrite. Under normal circumstances, a memory may be partitioned into data storage areas through physical partitioning based upon physical addresses (hereafter referred to as a physical partitioning technology) or through logical partitioning based upon logical addresses (hereafter referred to as a logical partitioning technology). In the physical partitioning technology, the memory is partitioned into storage areas based upon the physical addresses each indicating a specific recording position in the actual memory. In other words, each partitioned memory area is allocated with a range of contiguous physical addresses. Thus, the actual memory area where data are recorded is partitioned through the physical partitioning technology. The device and the method achieved in the embodiment adopt a memory management method based upon the physical partitioning technology.

Through the logical partitioning technology, the memory is partitioned into data storage areas based upon the logical addresses, each indicating a virtual recording position. A data storage device is usually equipped with a virtual memory function so as to be able to handle units of data exceeding the storage capacity of the actual memory. When this virtual memory is utilized, data recorded in the device are mapped within a virtual address space. The logical addresses indicate specific recording positions within this virtual address space. Accordingly, a given range of contiguous logical addresses is allocated to a given memory area using the logical partitioning technology. In addition, a logical address allocated with specific data is mapped at the corresponding physical address via an address conversion mechanism. The continuity of the logical addresses in the virtual address space is not always reflected in the physical address space. As a result, a memory area represented by contiguous logical addresses may be mapped over discontinuous physical addresses.

The nonvolatile memory 112 achieved in the embodiment includes a plurality of memory areas each corresponding to a range of contiguous physical addresses. Each memory area, in turn, includes a data rewrite buffer area used when rewriting data. Data in a memory are normally updated by writing new data over old data. However, the non-contact type IC card or the like mentioned earlier is powered via carrier waves received from the reader/writer. For this reason, a situation in which the power supply is cut off while data are being written into the memory could easily occur. The data update method achieved by overwriting old data with new data is prone to the risk of both the new data and the old data becoming erased from memory in a non-contact type IC card or the like if the power supply stops before completion of the new data record processing. Since the processing executed to write data into the nonvolatile memory 112 takes approximately several milliseconds, the nonvolatile memory 112 may become unstable with the data incompletely written, if the power supply stops during the data write processing.

Accordingly, instead of writing the new data over the old data, the memory management unit 106 first records the new data in the buffer area and then erases the old data only after the new data record processing is completed. In addition, a blank area created by the erasure of old data is assigned as a new buffer area. As explained earlier, each physically partitioned memory area in the nonvolatile memory 112 includes a buffer area. Accordingly, the memory management unit 106 utilizes the buffer area in each memory area when updating the data in the memory area. Thus, the memory management unit 106 is able to safely update data while maintaining continuity of the individual physically partitioned memory areas. Furthermore, the memory management unit 106, no longer required to execute a search over a range of addresses allocated to other memory areas when updating the data recorded in a given memory area, is able to update the data at high speed. It is to be noted that the term "continuity" in this context refers to a case in which the data may be completely processed within the memory area where the data are recorded. In other words, the term indicates that as data are updated or rearranged, the physical address range of the particular memory area remains unchanged.

The memory management unit 106 may update data in units of pages. The minimum data write unit with which data may be written into the nonvolatile memory 112 is not limited to one byte and the data may be written into the nonvolatile memory in units of several bytes. Such a minimum write unit is referred to as a page. For instance, in a memory in which write processing is executed in units of four bytes, one page is equivalent to four bytes.

The nonvolatile memory 112 may be, for instance, an EEPROM (Electrically Erasable Programmable Read Only Memory), a flash memory, a FeRAM (FerroElectric Random Access Memory) or the like.

As described above, the principal components of the data storage device in the embodiment include the nonvolatile memory 112 and the memory management unit 106. The nonvolatile memory 112, in turn, includes a plurality of physically partitioned memory areas with a buffer area set in each memory area. The memory management unit 106 executes data update processing by utilizing the buffer area in the target memory area when updating the data recorded in the target memory area. The data storage device, which includes these structural components is able to update data in each memory area while maintaining the continuity of the memory areas. In addition, the data storage device is able to limit the memory area to be referenced when executing data update processing to a specific range. As a result, advantages such as an improved data access speed and an improvement in data update processing efficiency may be achieved.

A structure adopted in the communication device 100 having the data storage device in the embodiment installed therein has been described in detail above. The memory management method adopted in the data storage device is explained next. As described earlier, a specific method of data update processing, achieved by utilizing the rewrite buffer area (hereafter referred to as a write buffer) included in each of the plurality of memory areas, is adopted in the embodiment. Before explanation of the embodiment in further detail, a data update method achieved by utilizing the write buffer is described. In the explanation, a data update process through which the data in a given memory area are updated is described as an example. In addition, an example of a data update method achieved by using a redundant management table correlating the physical addresses with the logical addresses is also explained.

First, the conceptual data structure assumed in the data recorded in the nonvolatile memory 112 so as to enable the memory management unit 106 to manage the data effectively is explained. Then, the method adopted to update the data arrangement in the logical address space, the data arrangement assumed in the physical address space and the management table is described.

(Conceptual Data Structure)

Figure 2:
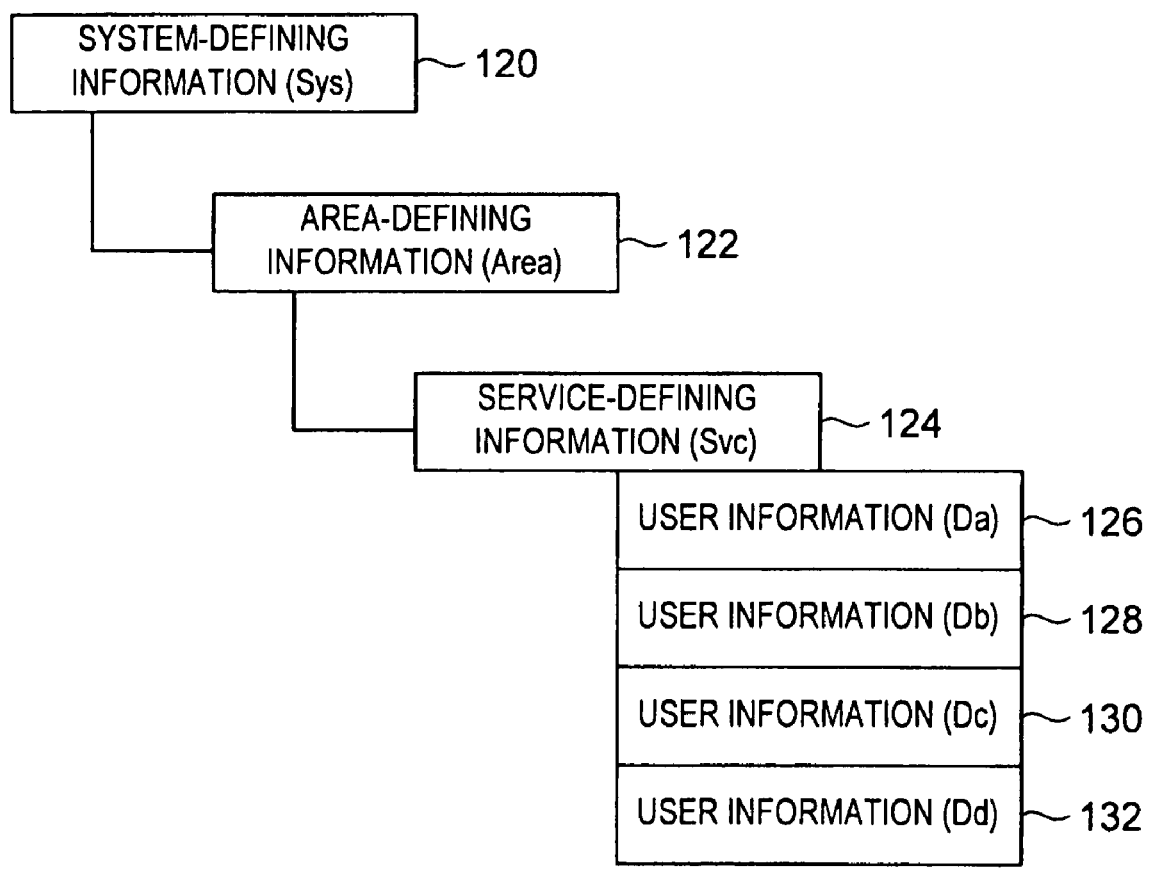
FIG. 2 illustrates a conceptual data structure adopted in the embodiment.

In reference to FIG. 2, the conceptual data structure assumed for the data held in a data storage device in the embodiment is explained. The data storage device holds system-defining information 120, area-defining information 122 and service-defining information 124, as principal management information. In addition, the data storage device holds sets of user information 126, 128, 130 and 132, in correspondence to each of the services defined based upon the service-defining information 124.

The system-defining information 120 includes, for instance, system codes, system key information and system key version information. The system codes are two-byte length codes, each indicating a specific system owner. In addition, the system key information, which is set in correspondence to each system, is used when executing mutual reader/writer authentication. The system key version information is used in the management of system key generation information. The system-defining information 120 defines the individual types of systems and the like managed within the nonvolatile memory 112.

The area-defining information 122 mainly includes area codes, end service codes, allocated block number information, blank block number information, area key information and area key version information. The area codes are each used to identify a specific area. In a system such as the non-contact type IC card mentioned earlier, the user information is managed in service units. In addition, the system manages a plurality of services in a batch by managing them in units of areas. The areas and the services assume a hierarchical structure. In addition, the areas represent a higher-order concept relative to the services. Moreover, the area-defining information 122 may include, for instance, wicket area information, entry/exit area information, settlement area information or the like.

The end service codes each indicate the value of the upper limit defining the service code range corresponding to a specific area. The allocated block number information indicates the number of blocks allocated to the area. The blank block number information indicates the number of blocks not allocated to any of the services belonging to the area. The area key information is key information specified in correspondence to each area, to be used in mutual authentication between areas or between the area and the services set as lower order information relative to the area. The area key version information is used in the management of area key generation information.

The service-defining information 124 mainly includes service codes, allocated block number information, service key information and service key version information. The service codes are used to identify the services. The term "service" in this context may refer to, for instance, name, street address, balance, transportation zone, transportation history or the like. For instance, the service-defining information 124 may define a name service, a balance service, a transportation zone service, a transportation history service and the like as lower-order services relative to the wicket area. In addition, the allocated block number information indicates the number of user information blocks allocated to each service. The service key information is key information specified in correspondence to each service. The service key version information is used in the management of service key generation information.

The sets of user information 126, 128, 130 and 132 are information that is actually read and written. For instance, each set of user information may indicate a customer number, an electronic money value or entry/exit history. Or user information belonging to the balance service may be numerical value information indicating the balance. In addition, when reading or writing the user information 126, the memory management unit 106 is able to access the block where the user information 126 is recorded by referencing the service code and the block information included in the service-defining information 124.

The conceptual data structure assumed for the data stored in the data storage device in the embodiment has been explained above in reference to FIG. 2. As described above, the data structure in the embodiment may form a hierarchical structure in the hierarchical order of; the system-defining information (Sys) 120, the area-defining information (Area) 122 and the service-defining information (Svc) 124. In addition, a set of user information (Da) 126, (Db) 128, (Dc) 130 and (Dd) 132 may be recorded in correspondence to each of the services defined in the service-defining information 124 in the data storage device. Since the data can be referenced in correspondence to the systems, areas or services as described above, efficient data management is achieved. However, the data assuming the conceptual data structure described above are actually managed by utilizing a logical table indicating the positional arrangement of data assumed in the logical address space, a physical table indicating the positional arrangement of data in the actual memory with the data positions made to correspond with the logical addresses, and a management table correlating the data positions in the logical tables with the data positions in the physical table. The data structures adopted in the logical table, the physical table and the management table, are explained next. Then, the data update method achieved in the embodiment is also explained.

(Structure of the Logical Table)

Figure 3:
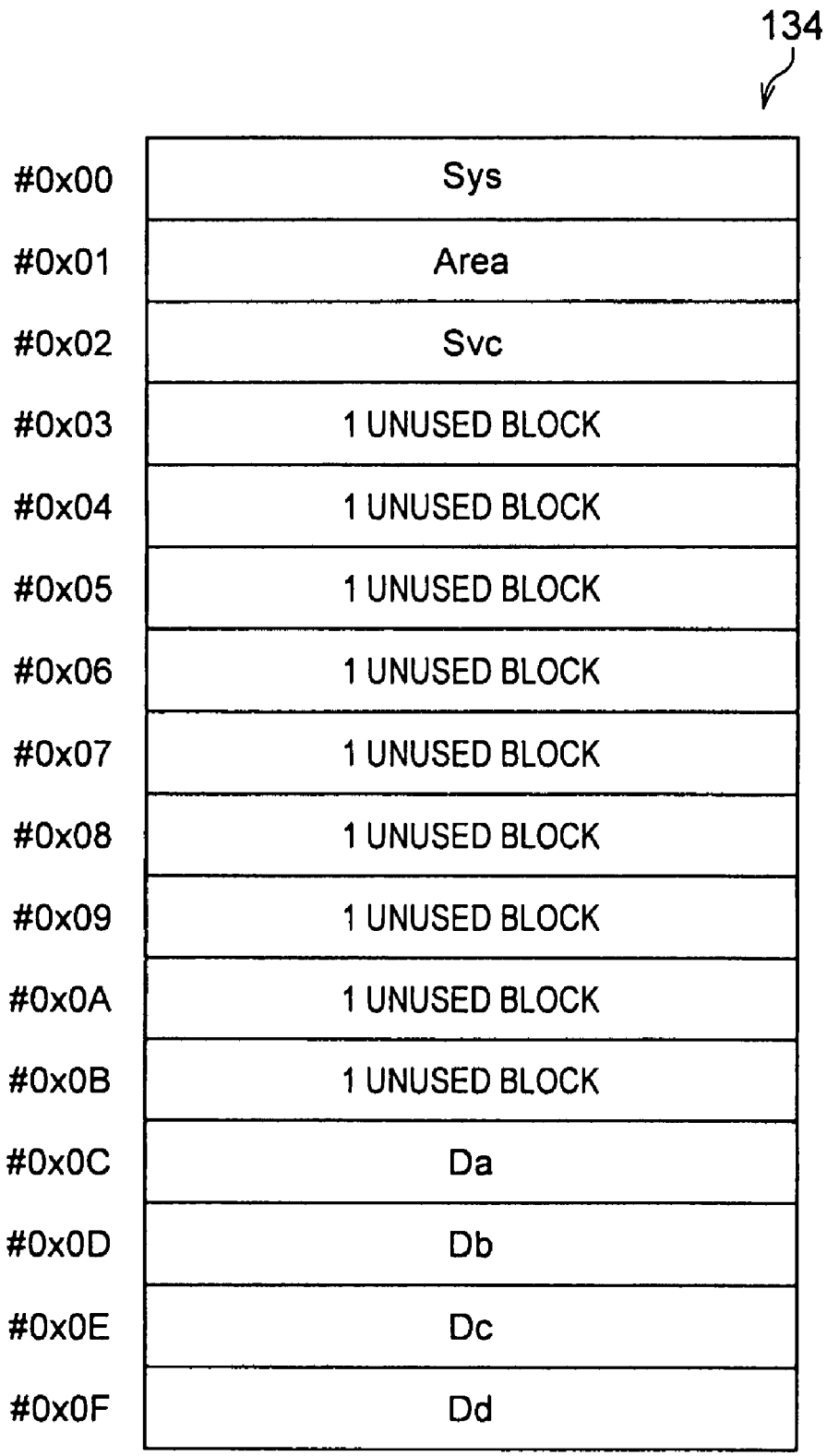
FIG. 3 illustrates the logical data arrangement adopted in the embodiment.

First, in reference to FIG. 3, a logical table 134 is described. FIG. 3 presents an example of the logical table 134 indicating the data positional arrangement assumed in the logical address space. "#" in the figure indicates a logical address.

As shown in FIG. 3, the system-defining information Sys, the area-defining information Area, and the service-defining information Svc are recorded in this order at #0x00-#0x02 in the logical table 134. In addition, the sets of user information Da, Db, Dc and Dd are recorded at #0x0C-#0x0F in the logical table 134. #0x03-#0x0B are unused blocks. However, the logical table 134 simply defines a virtual data arrangement. Accordingly, although Da, Db, Dc and Dd are allocated to contiguous logical addresses in the example presented in FIG. 3, they are not necessarily allocated to contiguous physical addresses in the actual memory. In addition, the size of the logical table 134 is not restricted to a size that allows the logical table to be recorded in the actual memory.

(Structure of the Physical Table)

Next, in reference to FIG. 4, a physical table 136 is described. FIG. 4 presents an example of the physical table 136 indicating the data positional arrangement assumed in the physical address space. "&" in the figure indicates a physical address. For instance, &0x04 indicates a block located at row 2/column 1 in the physical table 136. In addition, the data are set so that the physical address increases in sequence along the direction in which the rows extend. For instance, the block located at row 3/column 4 in the physical table 136 is identified by physical address &0x0B.

As shown in FIG. 4, the sets of user information Da, Db, Dc and Dd are set at &0x00-&0x03, the system-defining information Sys is set at &0x04, the area-defining information Area is set at &0x05 and the service-defining information Svc is set at &0x08 in the physical table 136. "blk" indicates a blank area, whereas "wb" indicates a buffer area used for data rewrite. It is to be also noted that the blocks allocated to function as a write buffer is hatched in FIG. 4.

(Structure of the Management Table)

Next, in reference to FIG. 5, a management table 138 is explained. Information that correlates the logical table 134 in FIG. 3 with the physical table 136 in FIG. 4 is recorded in the management table 138.

In the example presented in FIG. 5, the management table 138 is allocated to &0x80-&0x9F. The management table 138 in the embodiment may include, for instance, two management areas, one of which may be set in a active state with the other management area set in an inactive state. In the example presented in FIG. 5, &0x80-&0x8F constitutes the active management area and &0x90-&0x9F constitute the inactive management area. In the figure, the inactive management area is indicated by hatching the range corresponding range. It is to be noted that the management table 138 in the embodiment may instead be divided into three or more management areas, or it may be made up of a single management area.

In addition, in the active management area in the management table 138, physical addresses corresponding to the individual blocks in the logical table 134 are recorded in sequence, starting at the leading block. For instance, in the first block in the active management area designated as &0x80, the physical address &0x04 corresponding to the first block #0x00 in the logical table 134 is recorded. In addition, the block corresponding to the fourth logical address #0x03, counting from the beginning of the logical table 134, is an unused block. Accordingly, &0XFF is recorded in the block indicated by the fourth physical address &0x83 counting from the beginning of the management table 138.

The structures adopted in the logical table 134, the physical table 136 and the management table 138 have been explained above. A write buffer is included in the physical table 136 in the embodiment. In addition, a redundant management area is included in the management table 138. However, the tables in the embodiment may adopt structures other than those in the examples explained above. For instance, the physical table 136 may include a plurality of write buffers or the write buffer in the physical table may assume a size equal to or greater than one page. In addition, the management table 138 may be made up with a single management area, or it may be made up with three or more management areas. In other words, each of the tables described above may adopt any of various table structures. Next, the data update method adopted in the embodiment is explained by assuming that the individual tables are structured as described above.

(Data Update Method)

As explained earlier, a write buffer assuming a size matching one page is set in the physical table 136. The memory management unit 106 executes the data update processing by utilizing the write buffer. The management table 138 includes two management areas. When updating data, the memory management unit 106 writes post-update data into the redundant management area, instead of directly updating the data in the management area that is active at the pre-update stage. Then, only when the write processing is completed, the memory management unit 106 switches the active management area.

The following is an explanation given in reference to a specific example in which the user information Dc recorded at #0x0E in the logical table 134 is updated to Dc'. As explained earlier, the logical table 134 and the physical table 136 are made to correlate with each other via the management table 138. By referencing the management table 138, it can be ascertained that the physical address corresponding to the logical address #0x0E is &0x02 recorded at &0x8E in the management table 138. Accordingly, the memory management unit 106 updates the user information Dc recorded at the physical address &0x02 to Dc'.

After first updating the user information Dc recorded at the logical address #0x0E, the memory management unit 106 references the management table 138 and updates the data at the physical address &0x02 corresponding to the logical address #0x0E. At this time, instead of directly rewriting the user information Dc at &0x02 to the post-update data Dc', the memory management unit 106 records the post-update data Dc' into the write buffer. During this process, the memory management unit 106 also records the other data recorded in the row &0x00-&0x03 containing the pre-update data Dc, among the data recorded in the physical table 136, into the write buffer.

For instance, Da, Db, Dc' and Dd may be respectively recorded into &0x0C-&0x0F designated at the write buffer.

As explained earlier, the rewrite processing executed to write data in memory areas needs to be executed in units of the individual pages. For this reason, the memory management unit 106 will need to record the sets of data including the post-update data into a write buffer amounting to at least one page.

Figure 6:
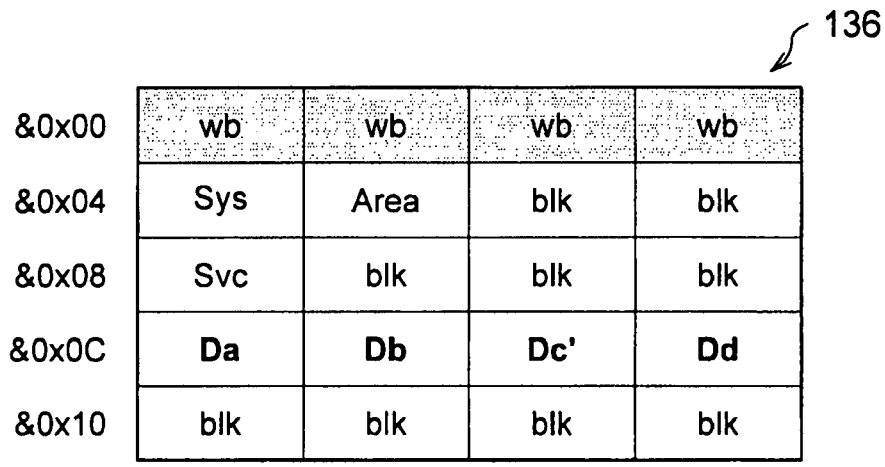
FIG. 6 shows the post-update physical table used in the embodiment.

As shown in FIG. 6, upon completing the data recording into the write buffer, the memory management unit 106 erases the data recorded in the row &0x00-&0x03 containing the pre-update data Dc at the physical table 136 and sets the row as a new write buffer. Then, the memory management unit 106 ends the update processing for the physical table 136. The method described above enables the memory management unit 106 to restore the system by using the existing pre-update data if the recording processing executed to record the post-update data falls.

Figure 7:
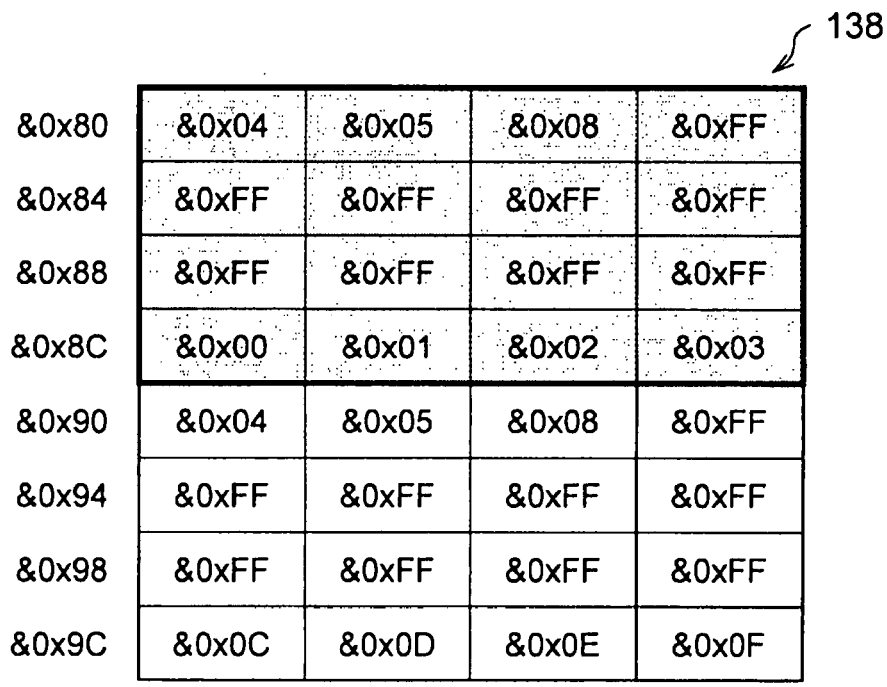
FIG. 7 shows the post-update management table used in the embodiment.

Next, the update processing executed to update the management table 138 is explained in reference to FIG. 7. The update processing for the management table 138 may be executed upon completing the write processing for writing the post-update data into the write buffer at the physical table 136.

The memory management unit 106 is able to execute the update processing for the management table 138 while both the post-update data and the pre-update data are held in the physical table 136. Upon completing the update processing for the management table 138, the memory management unit 106 is allowed to designate a new write buffer by erasing the pre-update data at the physical table 136.

As the physical table 136 is updated by using the write buffer as described above, the data arrangement in the physical table 136 becomes altered. The memory management unit 106 updates the management table 138 in which a correlation between the logical addresses and the physical addresses is written. While the memory management unit is updating the management table 138, the update processing may be unexpectedly interrupted. If the data in the management table 138 become lost or corrupted in the event of such an interruption, the memory management unit 106 will not be able to restore the system even by adopting the method for updating the physical table 136 described above. For this reason, the management table 138 achieved in the embodiment includes the redundant management area so as to allow the post-update data to be written while retaining the pre-update data.

As the physical table 136 is first updated, the memory management unit 106 writes information correlating the physical table 136 having undergone the update and the logical table 134 into the inactive management area at the management table 138. Then, upon completing the write processing for writing the correlation information into the inactive management area, the memory management unit 106 inactivates the pre-update active management area and designates the management area where the write processing has been completed as the active management area.

FIG. 7 shows the management table 138 having undergone the update processing described above. As the figure indicates, the memory management unit 106 is able to complete the update processing while retaining the pre-update data in the inactive management area ranging from &0x80-&0x8F. Upon completing the update processing, the memory management unit 106 erases the pre-update data in the physical table 136 and designates the new write buffer, thereby completing the data update processing.

The data update method achieved in the embodiment has been explained above in reference to FIGS. 3 through 7. Now, the data update method in the embodiment is summarized in reference to the flowchart presented in FIG. 8.

Figure 8:
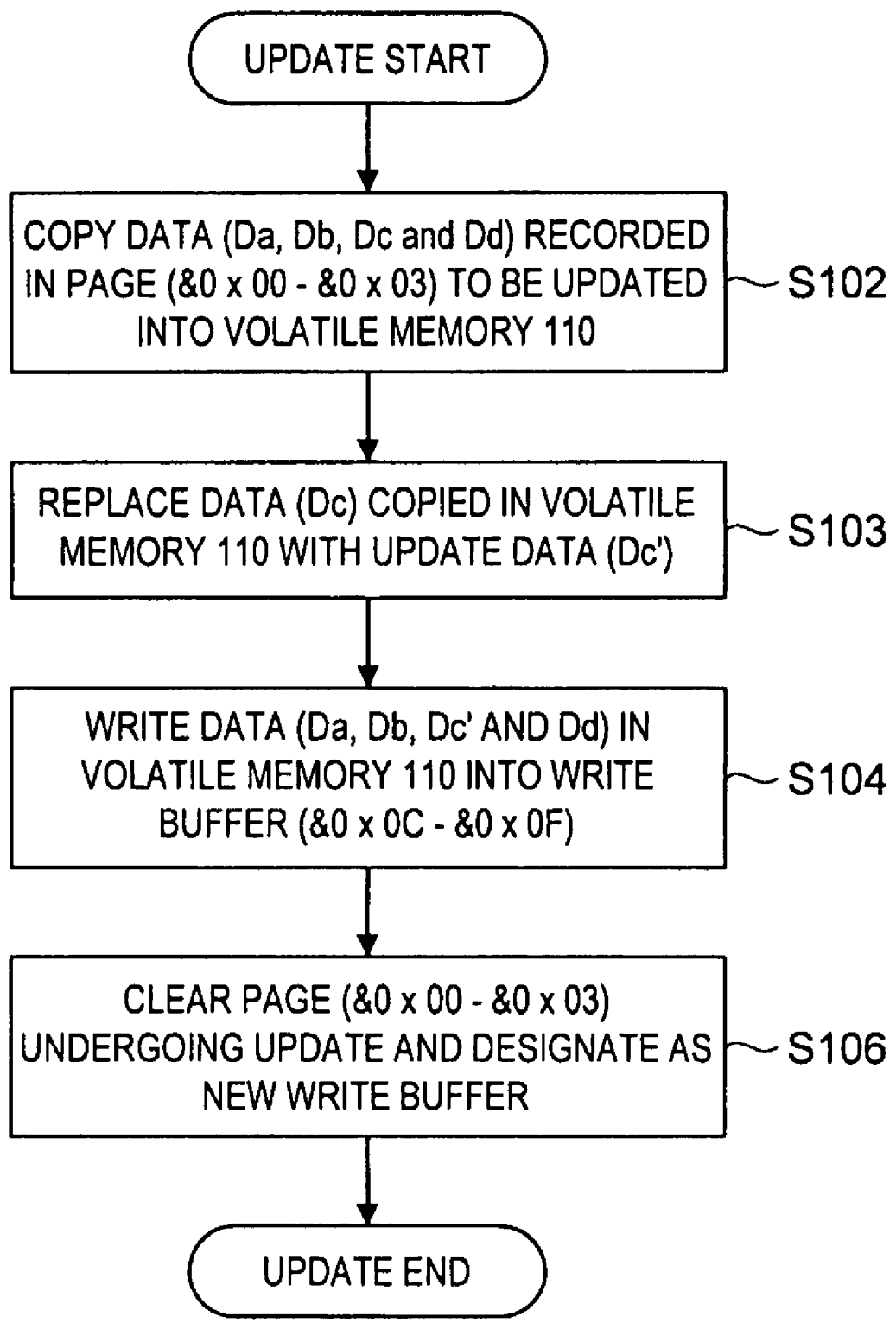
FIG. 8 presents a flowchart of the data update process executed by using the rewrite buffers in the embodiment.

FIG. 8 presents a flowchart of the processing executed to update data recorded in the physical table 136 by using the write buffer. As shown in FIG. 8, the memory management unit 106 copies the data (Da, Db, Dc and Dd), recorded in the page to be updated (&0x00-&0x03), into the volatile memory 110 (S102). Next, the memory management unit 106 rewrites the copied data (Dc) in the volatile memory 110 to the post-update data (Dc') (S103). After rewriting the old data by using the post-update data, the memory management unit 106 writes the data (Da, Db, Dc' and Dd) in the volatile memory 110 into the write buffer (&0x0C-&0x0F) (S104). Then, the memory management unit 106 clears the updated page (&0x00-&0x03) and designates the page as the new write buffer (S106).

As has already been mentioned, the data update processing is executed in the embodiment in units of individual pages by utilizing a write buffer in a size matching one page. The page size is set to the writable size inherent to each storage device. While an explanation is given above in reference to an example in which one page equals four bytes (four blocks), the page size can be set freely in correspondence to the specific type of storage device in use. The method described above enables the memory management unit 106 to restore the system by using the pre-update data if the power supply is cut off while the data update processing is in progress. The physical table 136 or the management table 138 may include an error flag, e.g., CRC (Cycle Redundancy Check) information indicating whether or not the post-update data write has been completed.

The method for updating data by using the write buffer set in a single memory area has been explained above. Now, an explanation is given on a data update method that may be adopted when updating data in physically partitioned memory areas.

First, in reference to FIG. 9A, 9B and 9C, a brief explanation is provided on the difficulty in adopting the data update method described above in conjunction with physically partitioned memory areas.

FIG. 9A shows a pre-partition physical table 144. S0 in the figure indicates that the data belonging to system 0 are recorded in the corresponding areas. The data may include, for instance, the system-defining information, the area-defining information, the service-defining information or the user information. S1 in the figure indicates the data belonging to system 1 are recorded in the corresponding areas. In addition, wb indicates the write buffer. S0blk indicates a blank area belonging to system 0.

FIG. 9B shows a post-partition physical table 144. FIG. 9B indicates that among the available areas corresponding to system 0, the areas specified by the physical address range &0x1E-&0x23 have been set aside as memory areas for system 2. S2 in the figure indicates that data belonging to system 2 are recorded therein. S2blk indicates a blank area belonging to system 2. In addition, it is assumed that the data Dc are recorded at the physical address &0x21.

When the memory is physically partitioned into memory areas each corresponding to one of the systems, as in the example presented in FIG. 9B, the memory management unit 106 only needs to execute a search over the range &0x1E-&0x23 to search for the data Dc belonging to system 2. When searching for data belonging to system 0 or system 1, on the other hand, the memory management unit 106 only uses to execute a search over the range &0x00-&0x1D, and thus, only a limited range is used. As a result, the length of time spent the memory management unit 106 accessing the desired data can be reduced, assuring higher speed in the data search processing, the data update processing and the like. In other words, the method of physically partitioning memory areas is effective when a memory with a large storage capacity is used or when the search processing are executed at high speed.

However, in order to take full advantage of the physical partitioning method described above, each partitioned memory area had better be indicated by a range of contiguous physical addresses and each physical address range had better remain independent. The memory management unit 106, searching for data belonging to a specific system executes a search over the range starting from the leading physical address of the system and ending at the terminating physical address of the system. If an area having recorded therein data belonging to another system is present between the leading address and the terminating address of the system, the memory management unit 106 will scan the area where the search target data are not present. For instance, immediately after physically partitioning the memory when data belonging to each system are allocated to contiguous physical addresses, the concerns described above do not arise. However, as data update processing is repeatedly executed by using the write buffer as described above, the continuity of the individual physically partitioned areas will become gradually compromised.

FIG. 9C presents a specific example of such a situation. FIG. 9C shows the physical table 144 having undergone update processing executed by utilizing the write buffer on data having been held in the physical table 144 immediately after the partition. A processing example in which the data Dc recorded at &0x21 in the physical table 144 immediately after the partition are updated to the data Dc' is now considered.

In the physical table 144 prior to the update (immediately after the partition), the write buffer is set over &0x0C-&0x0F. In order to update the data Dc at &0x021, the memory management unit 106 first copies the data at &0x20-&0x23 into the write buffer. In addition, the memory management unit 106, having written the post-update data Dc' into the write buffer, erases the data in the row over &0x20-&0x23 where the pre-update data have been present and designates the row as the new write buffer.

As indicated in FIG. 9C, the area corresponding to system 2 is split over &0x0C-&0x0F and &0x1E-&0x1F. As a result, the memory management unit 106, searching for data recorded for system 2, will scan a wide scanning range &0x0C-&0x1F containing data belonging to other systems as well.

As described above, even when the memory is physically partitioned, it is difficult to maintain continuity of the memory areas allocated to individual systems with a single write buffer utilized in the data update processing. However, it is critical in the nonvolatile memory 112 used in the non-contact type IC card or the like to assure both safety and high speed with regard to the data update processing. A memory management method that may be adopted in the nonvolatile memory 112 in the data storage device is explained next.

(Memory Management Method)

First, in reference to FIG. 10A, the structure of the nonvolatile memory 112 is explained. The nonvolatile memory 112 in FIG. 10A includes a physical table 150 used as a data area and a system partition area 152 having recorded therein system partition information.

The physical table 150 indicates the positional arrangement of data assumed before the physical partition, with data belonging to system 0 and data belonging to system 1 existing in a mixed state. In the system partition area 152, information indicating the start point and the end point of each physical address range at which data belonging to either system may be present, is held. In the example presented in FIG. 10A, system 0 and system 1 are not physically separated and thus, the information recorded in the system partition area 152 indicates the start point &0x00 and the end point &0x2B of the physical address range within which the data (S0) corresponding to system 0 may be present and also indicates the start point &0x00 and the end point &0x2B of the physical address range within which the data (S1) corresponding to system 1 may be present.

Now, an example in which part of the blank area corresponding to system 0 is partitioned as a memory area of system 2 is considered. The memory management unit 106 designates the blank area of system 0 over the physical address range &0x20-&0x2B as a partitioned area for system 2. At this time, the write buffer for system 2 is set within the area corresponding to system 2 independently of the write buffers for the other systems, as shown in, for instance, FIG. 10B. By physically partitioning the memory in this manner, the area where the data belonging to systems 0 and 1 may be present is limited to &0x00-&0x1F. In addition, the area in which the data belonging to system 2 may be present is limited to &0x20-&0x2B. Once the physically partitioned memory areas are defined, the memory management unit 106 updates the system information related to systems 0 and 1 as indicated in the system partition area 152 and then adds the information related to system 2.

As described above, when updating the data belonging to a specific system, the memory management unit 106 is able to simply scan the physical address range corresponding to that particular system from its start point to its end point without having to execute any redundant procedure by referencing the system partition information recorded in the system partition area 152. For instance, the memory management unit 106, searching for the data belonging to system 2, references the S2 field recorded in the system partition area 152 and ascertains that the physical address range for system 2 is &0x20-&0x2B. Subsequently, the memory management unit 106 scans the physical address range from the start point &0x20 through the end point &0x2B to locate the desired data. Thus, it is no longer necessary to access the physical address range &0x00-&0x1F irrelevant to system 2, which allows the memory management unit to access the desired data very quickly.

Next, in reference to FIG. 10C, the data update processing method adopted in the embodiment and its advantages are explained.

As shown in FIG. 9A, 9B and 9C, if data update processing is executed by using a common write buffer shared by a plurality of physically partitioned memory areas, memory area fragmentation is bound to occur. As a result, the write buffer will be set at a position bearing no relevance to the cutoff points of the physically partitioned memory areas and as data belonging to a specific system are updated, the write buffer, assuming a position bearing no relevance to the memory area to which the particular system is allocated will be designated as a post-update data area.

The data storage device in the embodiment, which addresses the issue of memory area fragmentation, has already been explained in reference to FIGS. 10A and 10B. The data storage device differs from the data storage device explained in reference to FIG. 9A, 9B and 9C in that it includes a write buffer in correspondence to each of the physically partitioned memory areas. The data update method achieved in the embodiment is now explained in more specific terms in reference to FIGS. 10B and 10C.

First, an example in which the data Dc recorded at &0x26 at the post-partition physical table 150 are updated to Dc' is explained. The data Dc belonging to system 2 are updated by utilizing the write buffer set in correspondence to system 2.

The memory management unit 106 first writes the sets of data recorded in the page containing the pre-update data Dc into the write buffer of system 2. Then, the memory management unit 106 writes the post-update data Dc' into the write buffer. In addition, upon completing the write processing for writing the data into the write buffer, the memory management unit 106 erases the data recorded in the page containing the pre-update data and designates the page as the new write buffer. In this instance, the write buffer assumes a position within the physical address range of system 2. Since the particular write buffer is utilized only when updating the data belonging to system 2, the physical address range of the physically partitioned memory area remains unchanged. It goes without saying that once the memory is physically partitioned, the memory management unit 106 does not need to update the system partition information either.

As explained above, the nonvolatile memory 112 is physically partitioned into a plurality of memory areas and a write buffer is included in each partitioned memory area in the data storage device achieved in the embodiment. In addition, a specific system is allocated to one of the partitioned memory areas and the write buffer in the memory area is utilized only when updating the data belonging to the particular system in the data storage device. It is to be noted that the physical address range of each partitioned memory area may be recorded as the system partition information in the system partition area. As a result, the memory management unit 106 searching for data belonging to a specific system is able to execute safe data update processing by utilizing the corresponding write buffer and, at the same time, is able to quickly access the desired data.

Second Embodiment

The functional structure and the memory management method adopted in the data storage device achieved in the first embodiment of the present invention have been explained above. The data storage device achieved in the second embodiment of the present invention described next assumes a basic functional structure substantially identical to that of the data storage device in the first embodiment and, accordingly, a repeated explanation is omitted. The second embodiment provides a means for defragmenting data in correspondence to each physically partitioned memory area. The data defragmentation method adopted in the second embodiment is now explained in reference to FIG. 11.

The term "data fragmentation" in this context refers to storage area fragmentation. Such fragmentation occurs as data are repeatedly written and deleted at a disk, the file arrangement within the disk becomes discontinuous and contiguous blank areas become scarce. Thus may result in a greater number of data files that cannot be stored in their entirety into any of the blank areas.

Under such circumstances, the memory management unit 106 will save a given data file that is difficult to be stored into a single blank area by dividing the data file so as to store it in two or more separate blank areas. Thus, in turn, will slow down the data read/write speed. Accordingly, the memory management unit 106 rearranges the data so as to defragment the data. Such defragmentation processing is normally referred to as defragmentation processing, through which the data in the memory are rearranged from the beginning and as the data is defragmented, the number of continuous blank areas is increased.

Figure 11A:
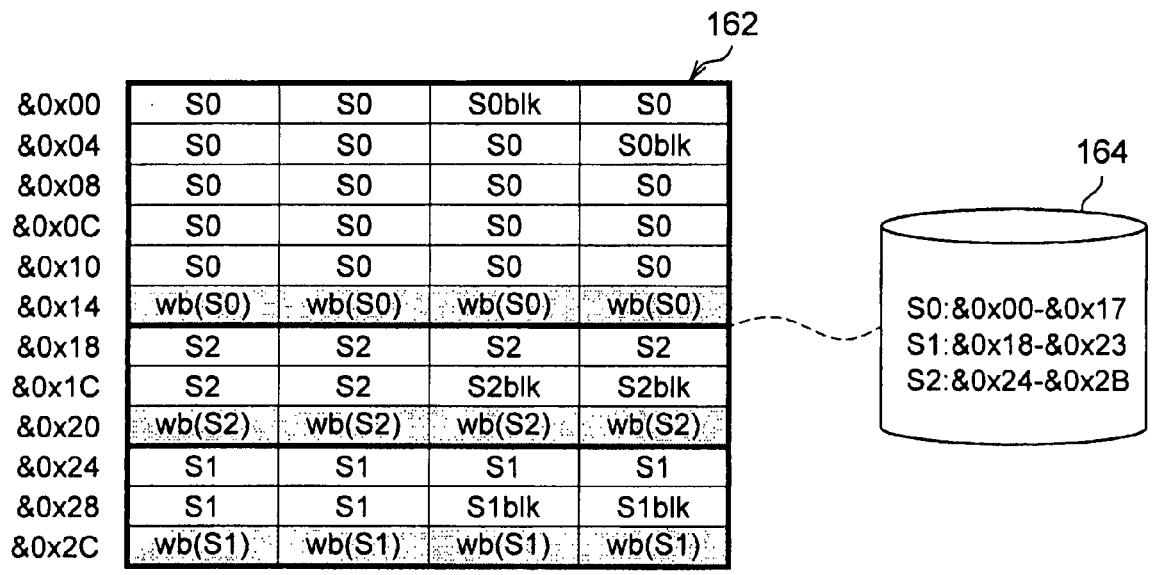
FIG. 11A illustrates the data defragmentation process executed in the embodiment.

FIG. 11A shows specific examples of a physical table 162 and a system partition area 164 in the pre-defragmentation state. The physical table 162 is physically partitioned in correspondence to three systems. In the memory area corresponding to each system, an exclusive write buffer to be utilized in correspondence to the particular system is set. In addition, as in the first embodiment, data belonging to a specific system are updated by utilizing the write buffer corresponding to the system in the embodiment. Accordingly, each physically partitioned memory area is defined by a physical address range, which is independent of the other physical address ranges. Information on the physical address range is recorded as system partition information in the system partition area 164. Thus, the data belonging to the specific system can be updated without disrupting the continuity of each partitioned memory area.

Figure 11B:
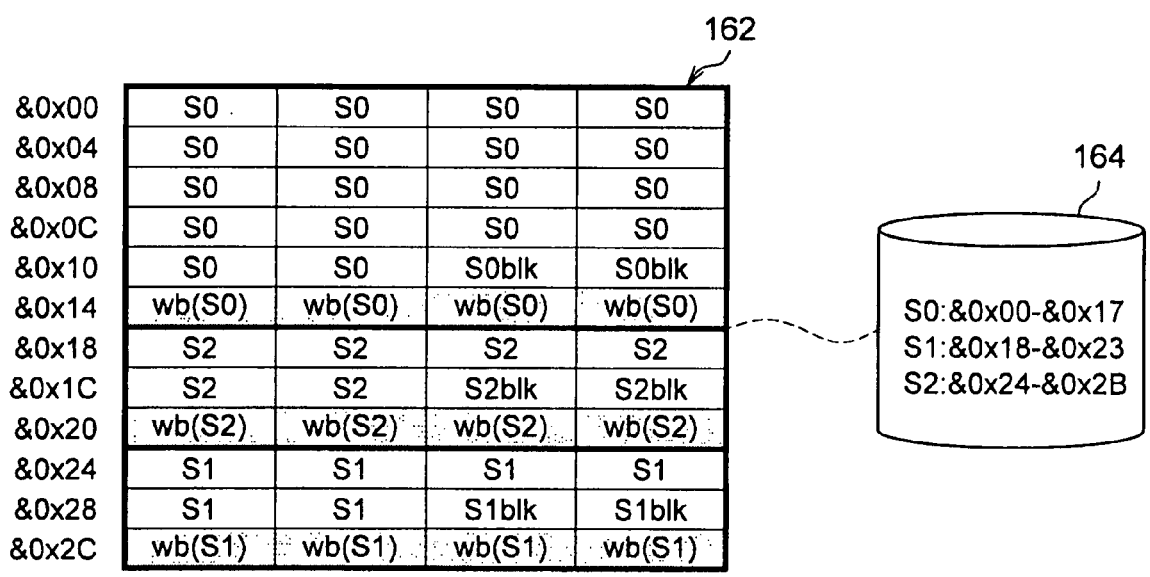
FIG. 11B illustrates the data defragmentation process executed in the embodiment.

The data defragmentation method achieved in the embodiment is now explained in more specific terms in reference to FIGS. 11A and 11B.

FIG. 11A indicates that the memory area corresponding to system 0 contains blank areas S0blk set discontinuously with respect to each other in a fragmented condition at the physical table 162. Accordingly, the memory management unit 106 rearranges the data so as to reassign the currently discontinuous blank areas to positions continuous to each other. The data rearrangement is executed by utilizing the write buffer included in the memory area corresponding to the particular system, as in the data update method explained earlier. For instance, the memory management unit 106 repeatedly rearranges the relevant data so as to reassign the blank area at &0x00 and the blank area at &0x07 to contiguous positions. 10086]

First, the memory management unit 106 records the data held at &0x00-&0x03 into the write buffer &0x14-&0x17 and also records the data at &0x06 into the write buffer &0x16. Subsequently, the memory management unit 106 erases the data at &0x00-&0x03 and designates &0x00-&0x03 as a new write buffer area. At this point, the data at &0x06 have already been copied into &0x16. Thus, the data at &0x06 are no longer necessary. Accordingly, the memory management unit 106 records the data in &0x04-&0x05 into the new write buffer &0x00 and &0x01, erases the data currently recorded at &0x04-&0x07 and designates &0x04-&0x07 as a new write buffer.

The memory management unit 106 is thus able to defragment the data as shown in FIG. 11B by executing the data rearrange processing and reassigning discontinuous blank areas to positions that are contiguous to one another. It is to be noted that the defragmentation method described above simply represents an example and the present invention is not limited to this particular data rearrangement method as long as blank areas are reassigned to contiguous positions. In addition, the memory management unit 106 may reassign blank areas together at the end of the physically partitioned memory area. In such a case, the memory management unit 106 will be able to access the desired data with an even higher level of efficiency, and thus, a further improvement in the data search speed is assured.

The data defragmentation method achieved in the second embodiment of the present invention has been explained above. As described above, the nonvolatile memory 112 in the second embodiment includes write buffers each corresponding to one of the physically partitioned memory areas. The memory management unit 106 rearranges the data in each partitioned memory area by utilizing the write buffer in the particular memory area. As a result, the rearrangement of the data does not alter the structure of the physically partitioned memory area. In other words, the physical address range of the partitioned memory area remains unchanged through the data rearrangement process. Consequently, the continuity of each partitioned memory area is maintained, allowing the memory management unit 106 to search for data belonging to a given system at high speed. This, in turn, leads to faster defragmentation processing. It is to be noted that the defragmentation processing may be executed at startup of the data storage device or it may be executed at the time of data erasure. It is obvious that the timing with which the defragmentation processing is executed is not limited to these examples and it may be set freely as appropriate for a specific mode of data storage device use.

It should be understood by those skilled in the art that various modifications, combinations, sub-combinations and alterations may occur depending on design requirements and other factors insofar as they are within the scope of the appended claims or the equivalents thereof.

What is claimed is:

1. A data storage device, comprising:
a memory that includes a plurality of physically partitioned memory areas,
wherein each of the plurality of physically partitioned memory areas includes a rewrite buffer area,
wherein the rewrite buffer area included in each the plurality of physically partitioned memory areas is used for data rewrite set within each partitioned memory area; and
a memory management unit for utilizing the rewrite buffer area for updating existing data in the physically partitioned memory area by writing update data in the rewrite buffer area included in the physically portioned memory area, and maintaining continuity of the individual physically partitioned memory areas.

2. A data storage device according to claim 1, wherein:
the memory management unit individually defragments data recorded in each partitioned memory area.

3. A data storage device according to claim 2, wherein:
the memory management unit individually defragments data recorded in each partitioned memory area when the data storage device is started up.

4. A data storage device according to claim 2, wherein:
the memory management unit defragments data recorded in the partitioned memory area when deleting data recorded in the partitioned memory area.

5. A data storage device according to claim 1, wherein:
the rewrite buffer area assumes a size matching the smallest unit of data that can be written into the memory.

6. A memory management method, comprising steps of:
partitioning a memory into a plurality of physically partitioned memory areas,
wherein each of the plurality of physically partitioned memory areas includes a rewrite buffer area,
wherein the rewrite buffer area included in each the plurality of physically partitioned memory areas is used for data rewrite set within each partitioned memory area; and
utilizing the rewrite buffer area for updating existing data in the physically partitioned memory area by writing update data in the rewrite buffer area included in the physically portioned memory area, and maintaining continuity of the individual physically partitioned memory areas.

7. A non-transitory computer-readable medium for storing executable program code for updating data recorded in each of a plurality of physically partitioned memory areas in a memory by utilizing a rewrite buffer area used for data rewrite, the program code comprising the steps of:
partitioning a memory into a plurality of physically partitioned memory areas,
wherein each of the plurality of physically partitioned memory areas includes a rewrite buffer area,
wherein the rewrite buffer area included in each the plurality of physically partitioned memory areas is used for data rewrite set within each partitioned memory area; and utilizing the rewrite buffer area for updating existing data in the physically partitioned memory area by writing update data in the rewrite buffer area included in the physically portioned memory area, and maintaining continuity of the individual physically partitioned memory areas.

* * * * *